United States Patent
Datla et al.

(10) Patent No.: US 8,108,911 B2
(45) Date of Patent: Jan. 31, 2012

(54) METHOD AND SYSTEM FOR DIRECTING USER BETWEEN CAPTIVE AND OPEN DOMAINS

(75) Inventors: Raju Datla, Cherry Hill, NJ (US); Srini Avirneni, Chester Springs, PA (US)

(73) Assignee: Comcast Cable Holdings, LLC, Philadelphia, PA (US)

( * ) Notice: Subject to any disclaimer, the term of this patent is extended or adjusted under 35 U.S.C. 154(b) by 977 days.

(21) Appl. No.: 11/933,669

(22) Filed: Nov. 1, 2007

(65) Prior Publication Data

US 2009/0119749 A1  May 7, 2009

(51) Int. Cl.
  G06F 7/04 (2006.01)
  G06F 15/16 (2006.01)
  G06F 17/30 (2006.01)
  H04L 29/06 (2006.01)
  H04L 12/28 (2006.01)
  H04L 12/56 (2006.01)

(52) U.S. Cl. ............. 726/3; 370/389; 709/229; 709/249

(58) Field of Classification Search .................. None
  See application file for complete search history.

(56) References Cited

U.S. PATENT DOCUMENTS

| | | | |
|---|---|---|---|
| 6,023,464 A | 2/2000 | Woundy | |
| 6,529,910 B1 | 3/2003 | Fleskes | |
| 6,553,568 B1 | 4/2003 | Fijolek et al. | |
| 6,570,855 B1 | 5/2003 | Kung et al. | |
| 6,574,796 B1 | 6/2003 | Roeck et al. | |
| 6,636,485 B1 | 10/2003 | Fijolek et al. | |
| 6,693,878 B1 | 2/2004 | Daruwalla et al. | |
| 7,272,846 B2 | 9/2007 | Williams et al. | |
| 7,496,652 B2 | 2/2009 | Pezzutti | |
| 7,512,969 B2 | 3/2009 | Gould et al. | |
| 7,836,092 B2 * | 11/2010 | Alaniz et al. .................. | 707/802 |
| 7,881,225 B2 | 2/2011 | Siripunkaw et al. | |
| 2002/0010865 A1 * | 1/2002 | Fulton et al. .................. | 713/201 |
| 2002/0013948 A1 * | 1/2002 | Aguayo et al. .................. | 725/91 |
| 2002/0106017 A1 | 8/2002 | Dombkowski et al. | |
| 2002/0116721 A1 | 8/2002 | Dobes et al. | |
| 2003/0014764 A1 | 1/2003 | Saladino et al. | |
| 2003/0069965 A1 | 4/2003 | Ma et al. | |
| 2003/0106067 A1 | 6/2003 | Hoskins et al. | |
| 2004/0190699 A1 * | 9/2004 | Doherty et al. .......... | 379/201.12 |
| 2004/0213278 A1 | 10/2004 | Pullen et al. | |
| 2005/0034115 A1 | 2/2005 | Carter et al. | |
| 2005/0060749 A1 | 3/2005 | Hong et al. | |
| 2005/0078668 A1 * | 4/2005 | Wittenberg et al. .......... | 370/389 |
| 2005/0122976 A1 | 6/2005 | Poli et al. | |
| 2005/0123001 A1 | 6/2005 | Craven et al. | |
| 2005/0204168 A1 * | 9/2005 | Johnston et al. .............. | 713/201 |
| 2006/0173977 A1 | 8/2006 | Ho et al. | |

(Continued)

OTHER PUBLICATIONS

ISR issued in PCT/US08/081422, mail date Dec. 23, 2008.

(Continued)

Primary Examiner — Shin-Hon Chen
(74) Attorney, Agent, or Firm — Banner & Witcoff, Ltd

(57) ABSTRACT

A method for limiting user access to a captive domain or an open domain. The captive domain may include electronically accessible content that is selected/controlled by a service provider and the open domain may include electronically accessible content that is not completely selected/controlled by the service provider. The method may include configuring a modem or other user device in such a manner as to limit use access to the desired domain.

20 Claims, 2 Drawing Sheets

U.S. PATENT DOCUMENTS

| | | |
|---|---|---|
| 2007/0016762 A1 | 1/2007 | Ho |
| 2007/0130471 A1 | 6/2007 | Walker Pina et al. |
| 2009/0063833 A1 | 3/2009 | Ho |
| 2010/0064356 A1 | 3/2010 | Johnston et al. |

OTHER PUBLICATIONS

Extended European Search Report and Search Opinion for EP Patent Application No. 08846111.6 dated Feb. 7, 2011.

Non-Final Office Action for U.S. Appl. No. 11/603,761 dated Apr. 16, 2007.

Non-Final Office Action for U.S. Appl. No. 11/603,761 dated Nov. 12, 2009.

Final Office Action for U.S. Appl. No. 11/603,761 dated Jun. 7, 2010.

* cited by examiner

METHOD AND SYSTEM FOR DIRECTING USER BETWEEN CAPTIVE AND OPEN DOMAINS

BACKGROUND OF THE INVENTION

1. Field of the Invention

The present invention relates to directing a user between captive and open domains.

2. Background Art

In a service provider network such as, but not limited to, those associated with television or high speed data service providers, particularly service providers that have a large customer base, one challenge faced by the service provider is to redirect customers to customized portals. These portals can be used for any number of reasons, including allowing customers to select service-specific configurations, displaying a warning message for reminding customers to take appropriate action, and/or forcing certain customers to the portal until the forced customer takes an appropriate action.

Existing approaches and/or solutions require intercepting all the network traffic and redirecting the traffic to service-specific portals in real time. This approach can be undesirable since the intercepted traffic can impact traffic for all customers. Another approach relies on reconfiguring a modem (Cable or DSL or FTTH) to direct the customer to the desired portal. This approach may not be preferred since the reconfiguring the modem requires the modem to be rebooting the modem before the customer is allowed to leave the specific portal.

BRIEF DESCRIPTION OF THE DRAWINGS

The present invention is recited with particularity in the appended claims. However, other features of the present invention will become more apparent and the present invention will be best understood by referring to the following detailed description in conjunction with the accompany drawings in which:

DETAILED DESCRIPTION OF THE PREFERRED EMBODIMENT(S)

Figure 1:
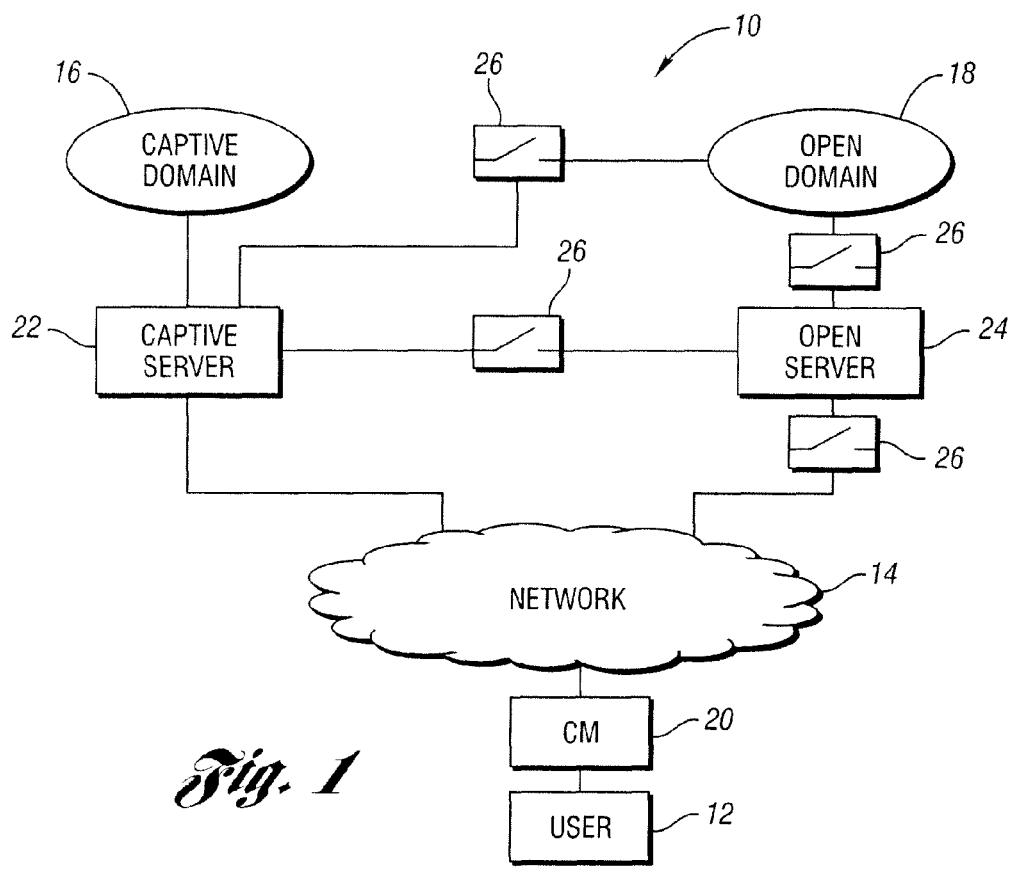
FIGS. 1-3 illustrate a system having captive and open domains in accordance with one non-limiting aspect of the present invention.

FIG. 1 illustrates a domain name system (DNS) 10 in accordance with one non-limiting aspect of the present invention. The system 10 may be associated with a television, high speed data, or other service provider (not shown) having capabilities to provide any number of services to a user 12 through signals carried over a service provider network 14. For exemplary purposes, the system 10 is predominately described with respect to the service provider supporting high speed data-related operations. The present invention, however, is not intended to be so limited and fully contemplates its application to any number of environments besides those associated with high speed data.

The system 10 may include at least one captive domain 16 and one open domain 18. The domains 16, 18 may include servers, databases, and other sources of electronic content. These sources may be characterized as being associated with different domains 16, 18 for exemplary purpose and to emphasize different access and content restrictions associated therewith. The content of each domain, however, may be shared between the domains 16, 18, i.e., the same server may support content that is accessible through both of the domains 16, 18. The term 'domain' may be characterized as a reference address, or forced address, used to access the content therein, as described below in more detail. The term 'domain' is selected to correspond with grouping characteristics associated with the exemplary DNS protocols and architectures that may be used to control and direct access to the domains 16, 18.

The open domain 18 may be associated with the World Wide Web or other similar domain where any internet or other network user may be free to access any type of content, including content provided by entities other than the service provider or entities not under the control/approval of the service provider. The captive domain 16 may be a private domain associated with the service provider or otherwise having controlled or forced access where the same user is forced to access content specified by the service provider or otherwise authorized/controlled by the service provider (i.e., walled garden). The captive domain 16 may optionally be accessible only to devices (users) authorized by the service provider and/or devices connected to the service provider network 14.

A piece of customer premise equipment (CPE), for example a cable modem (CM) 20, may be included to facilitate user access to the service provider network 14. The cable modem 20 may be configured to receive instructions and other commands from the service provider, including instructions associated with its provisioning. This may allow the service provider to configure DNS and other attributes of the cable modem 20 associated with allowing the user to access one of the domains 16, 18 through communications carried over the network 14. The attributes programmed to the cable modem 20 may be inherited by a computer or other device (not shown) connected to the cable modem 20 which the user controls to access the domains 16, 18. An ability of the service provider to individually and/or collectively provision its cable modems 20, or other equivalent device, to force user access to one of the domains 16, 18 allows the service provider to selectively control content accessible to its subscribers.

The cable modem 20 may be configured to facilitate communications with the service provider network 14 for relay to a captive server 22 and/or an open server 24 associated with the captive domain 16 and open domain 18, respectively. The servers 22, 24 may be DNS-type servers configured to facilitate access to the associated domains 16, 18. The servers 22, 24 may be configured to support any number of operations, including addressing operations associated with directing the user, or the cable modem 20 associated with the user, to specific portals/webpages associated with each domain 16, 18. The content associated with portals, web pages, etc. accessible through each domain 16, 18 may be hosted by elements associated with the domains 16, 18 and found through addresses and other instructions provided through the servers 22, 24.

FIG. 1 illustrates one configuration of the present invention where the cable modem 20 is instructed to facilitate communications with the captive server 22. The captive server 22 is further instructed to direct communications to the captive domain 16 and, optionally, to specific portals, webpages, etc. included within the captive domain 16. This arrangement may be beneficial if a need exists to force the user to access content specified by the service provider and included with the captive domain 16. For example, when the cable modem 20 is initially deployed and connected to the network 14, the service provider may restrict the cable modem 20 to access content available to through the captive domain 16, such as to provide a walled garden.

The cable modem 20, if initially restricted to accessing the walled garden, may begin an activation process where it is configured or otherwise instructed to perform or support various services purchased or otherwise available to the user. During this period, the cable modem 20 and/or captive server 22 may be instructed to allow the user to access specific portals within the captive domain 16. This can be helpful in forcing the user to select desired operating parameters and to allow the service provider to make sale offers, indicate promotions, and provide other information that may be of interest to the user at a particular period of time.

Figure 2:
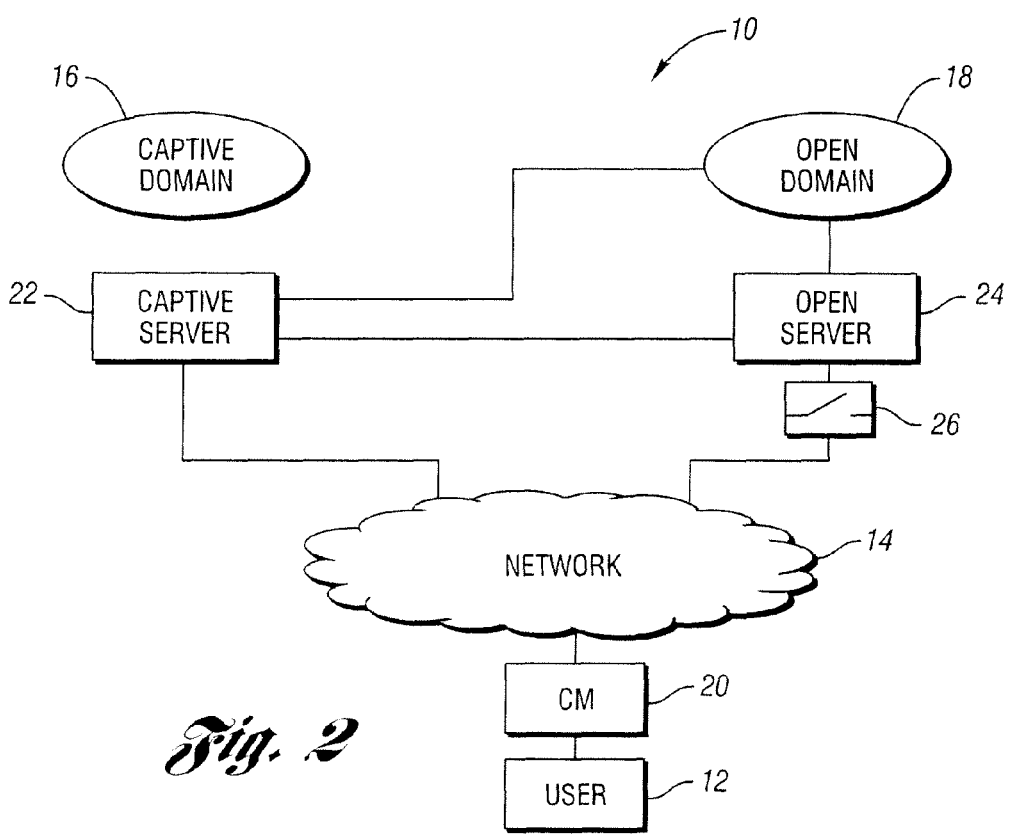

FIG. 2 illustrates the system 10 upon completion of the activation process or other event which limits access by the user the captive domain 16. The user is now able to access the open domain 18 and the content associated therewith. The access associated with FIG. 2 may require communications between the user and the open domain 18 to be routed or otherwise directed by the captive domain server 22, either through communications with the open server 24 (which may be necessary if the captive domain server 22 is unable to communicate with the open domain 18) and/or direct communications with the open domain 18. The use of the captive server 22 to facilitate access to the open domain 18 may be advantageous in allowing the user to access the open domain 18, after being restricted to the captive domain 16, without having to reboot or wait for reboot of the cable modem 20.

As one skilled in the art will appreciate, to change from one server to another, i.e., from the captive server 22 to the open server 24, the cable modem 20 may require a new configuration file, new parameter setting, or other instruction, which can only become effective once the cable modem 20 is rebooted. The present invention, at least with respect to one non-limiting aspect, contemplates its application to cable modems 20 which require reboot before new DNS attributes can be used to direct operations of the cable modem 20 and/or before they can be inherited by the device connected thereto.

The cable modem 20 may be rebooted manually through the user turning the cable modem 20 off and on and/or through the service provider directing the cable modem 20 to turn off and on. This type of reboot can be problematic since it requires the user to experience a short interruption in services and/or to perform a manual operation to the cable modem 20. Cable modems 20 or other types of CPEs may be configured by the service provider to be active on the network 14 for a pre-defined time with a renew interval defined every x number of days. The renew interval may allow for the cable modem 20 or other types of CPE to stay active on the network 14 and receive new and/or additional parameters with out any interruptions, or at least until expiration of the renew period when the service provider forces the cable modem 20 to reboot. This can be helpful in checking whether the cable modem 20 is still active and to update the cable modem 20 operations without a manual reboot. This type of reboot can be problematic since it requires completion of the renew period before the user is able to switch from one server to another.

The present invention allows the user to effectively switch from one server 22, 24 to another without the delays and/or interruptions mentioned above since the present invention is able to configure the captive server 22 to support operations necessary for allowing the user to access the open domain 18 prior to reboot of the cable modem 20, i.e., without requiring the cable modem 20 to directly communicate with the open server 24. Since the operations of the cable modem 20 are not, at least initially, changed when transitioning from FIG. 1 to FIG. 2, the present invention is able to allow the user to access the open domain 18 without having to reboot the cable modem 20 and without a disruption in services.

Figure 3:
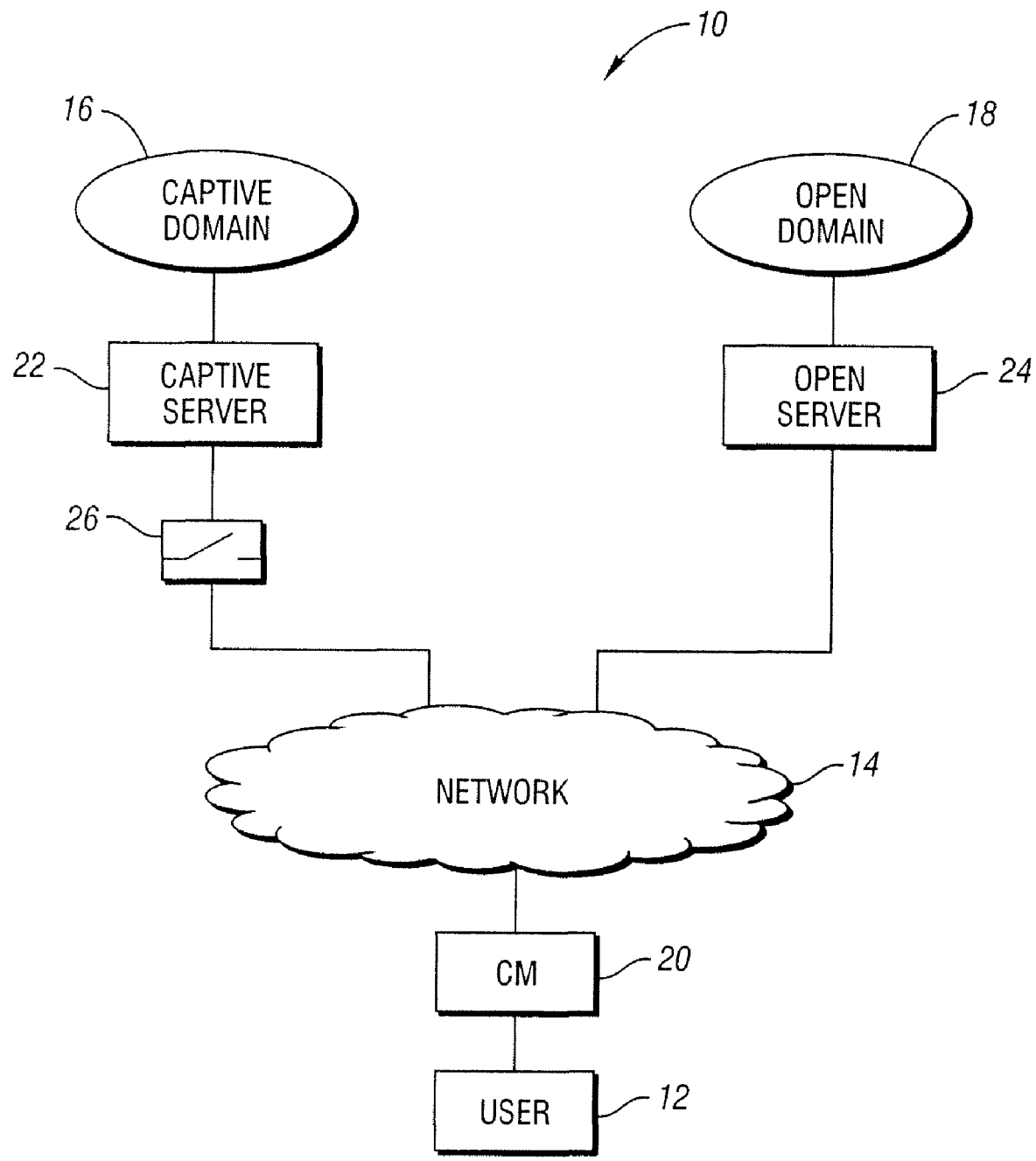

FIG. 3 illustrates the cable modem 20 communicating with the open server 24 instead of the captive server 22. This may occur upon expiration of the renew period and/or in response to a some other reboot, such as in response to the service provider issuing a signal to force an immediate reboot. As noted above and as long as the cable modem 20 receives the changes to its attributes, the reboot forces the cable modem 20 to facilitate communications with the open server 24 instead of the captive server 22 so as to provide access to the open domain 18 and its content. This can be helpful in moving the processing demands from the captive server 22 to the open server 24, freeing the captive server 22 to support captive domain communications with other users.

FIGS. 1-3 describe various aspect of the present invention and restricting user access to content available from one or more of the domains 16, 18. A number of switches 26 are shown to further demonstrate the restrictions. These switches 26 are shown of exemplary purposes and are not intended to reflect the need for actual switches are similar type devices to control access between the element connected thereto, although the present invention does contemplate the use of actual switches if needed in some environments. As such, while there may be physical or wireless connections between the elements connected by the switches 26, the switches 26 are primarily intended to symbolize access between the connected to elements. The switches 26 are shown in an open state to indicate an inability to communicate through the connection associated therewith.

The foregoing arrangement allows the present invention to address various business use cases. One use case may include relegating a customer to a captive portal during the activation process, where the customer is allowed to make service-specific configuration changes. Another use case may include relegating the customer to a captive portal, with a warning page and appropriate corrective or ignore options, when the customer has reached a threshold limit. Some threshold limit examples may include excessive bandwidth usage, excessive downloads/updates, or excessive generation of email/spam. Another use case may include relegating the customer to a captive portal, such as to inform them of missing or delayed payments to the service provider. Still another use case may include relegating the customer to a friendly portal, such as to support enhanced features like birthday greetings, at the request of the customer or in response to a message received from another user in communication with the system. Another use case may include forcing the customer to a captive portal until a corrective action is completed, such as to force the customer to correct an abuse of service, non-payment of bills, etc.

The present invention may be configured such that customers may be provisioned with specific DNS attributes without changing their provisioned service class and with the use of a DNS application controlled via a policy engine to redirect the customers to various portals. The present invention may leverage provisioning flows for modems (Cable or DSL or FTTH modems) and their supported capabilities to redirect the devices behind the modem to a particular DNS domain. This may include the use of various mechanisms to relegate customer traffic, under certain scenarios, to a captive portal. The present invention may operate in a triple-play environment with various devices, such as high speed modems (cable, DSL, or FTTH), VoIP endpoints (MTAs and IADs), video set-top boxes, and wireless handsets (3G and 4G).

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method comprising:
   receiving, at a domain name server for a captive domain, communications from a consumer premise equipment;
   allowing, at the domain name server for the captive domain, access by the consumer premise equipment to first content in the captive domain and disallowing, at the domain name server for the captive domain, access by the consumer premise equipment to second content in an open domain;
   configuring the domain name server for the captive domain to allow access by the consumer premise equipment to the second content; and
   configuring the consumer premise equipment to communicate with a domain name server for the open domain instead of the domain name server for the captive domain, wherein communications from the consumer premise equipment are received by the domain name server for the captive domain, which now allows access by the consumer premise equipment to the second content, before said configuration of the consumer premise equipment becomes active.

2. The method of claim 1, wherein the access to the second content is provided by the domain name server for the captive domain directing communications from the consumer premises equipment to one or more servers associated with the open domain.

3. The method of claim 2, wherein said domain name server for the captive domain provides access to the second content by directing communications from the consumer premises equipment to one or more domain name servers for the open domain.

4. A system comprising:
   a domain name server for a captive domain configured to:
      receive communications from a consumer premise equipment,
      allow access by the consumer premise equipment to first content in the captive domain and to disallow access by the consumer premise equipment to second content in an open domain, and
      upon completion of an event, allow access by the consumer premise equipment to the second content in the open domain;
      wherein completion of the event causes the consumer premise equipment to be configured to direct communications to one or more domain name servers for the open domain instead of the domain name server for the captive domain.

5. The system of claim 4, wherein the first content includes provider-specified content associated with a service provider of the consumer premise equipment.

6. The system of claim 5, wherein the domain name server for the captive domain is configured to allow access by the consumer premise equipment to the first content and to disallow access by the consumer premise equipment to the second content during an activation process to allow a user of the consumer premise equipment to make service-specific configuration changes associated with services offered by the service provider.

7. The system of claim 5, wherein the provider-specified content includes a warning page, wherein the domain name server for the captive domain is configured to disallow access by the consumer premise equipment to the second content based upon the consumer premise equipment reaching a threshold limit associated with consumption of services offered by the service provider.

8. The system of claim 5, wherein the provider-specified content includes information to a user of the consumer premise equipment of missing or delayed payments owed to the service provider.

9. The system of claim 5, wherein the provider-specified content includes a message sent by another user associated with the service provider.

10. The system of claim 5, wherein the domain name server for the captive domain is configured to allow access by the consumer premise equipment to the second content upon receiving a corrective action specified by the service provider.

11. The system of claim 4, wherein the domain name server for the captive domain is configured to allow access by the consumer premise equipment to the second content by directing communications from the consumer premises equipment to one or more servers associated with the open domain.

12. The system of claim 11, wherein the domain name server for the captive domain is configured to allow access by the consumer premise equipment to the second content by directing communications from the consumer premises equipment to one or more domain name servers for the open domain.

13. A method comprising:
    receiving, at a first server that is configured to facilitate access to a captive domain, communications from a consumer premise equipment;
    allowing, at the first server, access by the consumer premise equipment to first content in the captive domain and disallowing, at the first server, access by the consumer premise equipment to second content in an open domain;
    configuring the first server to allow access by the consumer premise equipment to the second content; and
    configuring the consumer premise equipment to communicate with a second server instead of the first server, wherein the second server is configured to facilitate access to the open domain, and wherein communications from the consumer premise equipment are received by the first server, which now allows access by the consumer premise equipment to the second content, before said configuration of the consumer premise equipment becomes active.

14. The method of claim 13, wherein the first content includes provider-specified content associated with a service provider of the consumer premise equipment.

15. The method of claim 14, wherein the allowing access by the consumer premise equipment to the first content and disallowing access by the consumer premise equipment to the second content occurs during an activation process, wherein the first content allows a user of the consumer premise equipment to make service-specific configuration changes associated with services offered by the service provider.

16. The method of claim 14, wherein the provider-specified content includes a warning page, wherein disallowing access by the consumer premise equipment to the second content occurs upon the consumer premise equipment reaching a threshold limit associated with consumption of services offered by the service provider.

17. The method of claim 14, wherein the provider-specified content includes information to a user of the consumer premise equipment of missing or delayed payments owed to the service provider.

18. The method of claim 14, wherein the provider-specified content includes a message sent by another user associated with the service provider.

19. The method of claim 14, wherein configuring the first server to allow access by the consumer premise equipment to the second content occurs upon receiving a corrective action specified by the service provider.

20. The method of claim 13, wherein the access to the second content is provided by the first server directing communications from the consumer premises equipment to the second server.

* * * * *